US010584966B2

(12) United States Patent
Gunawan

(10) Patent No.: US 10,584,966 B2
(45) Date of Patent: Mar. 10, 2020

(54) PRECISION INCLINOMETER WITH PARALLEL DIPOLE LINE TRAP SYSTEM

(71) Applicant: International Business Machines Corporation, Armonk, NY (US)

(72) Inventor: Oki Gunawan, Westwood, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/265,092

(22) Filed: Feb. 1, 2019

(65) Prior Publication Data
US 2019/0162533 A1 May 30, 2019

Related U.S. Application Data

(62) Division of application No. 15/198,183, filed on Jun. 30, 2016, now Pat. No. 10,234,286.

(51) Int. Cl.
*G01C 9/06* (2006.01)
*G06T 7/70* (2017.01)

(52) U.S. Cl.
CPC .............. *G01C 9/06* (2013.01); *G06T 7/70* (2017.01); *G01C 2009/062* (2013.01); *G01C 2009/066* (2013.01); *G06T 2207/10016* (2013.01); *G06T 2207/30108* (2013.01)

(58) Field of Classification Search
CPC ........ G01C 2009/062; G01C 2009/066; G01C 9/06
USPC .............................................. 33/365
See application file for complete search history.

(56) References Cited

U.S. PATENT DOCUMENTS

| 3,492,738 | A | 2/1970 | Simon |
| 4,430,803 | A | 2/1984 | Flanders |
| 5,177,387 | A | 1/1993 | McMichael et al. |
| 5,365,671 | A | 11/1994 | Yaniger |
| 5,396,136 | A | 3/1995 | Pelrine |
| 5,887,018 | A | 3/1999 | Bayazitoglu et al. |
| 7,252,001 | B2 | 8/2007 | Boletis et al. |
| 7,597,002 | B2 | 10/2009 | Moser et al. |
| 7,859,157 | B2 | 12/2010 | Baur |
| 8,895,355 | B2 | 11/2014 | Cao et al. |

(Continued)

OTHER PUBLICATIONS

Gunawan et al., "A parallel dipole line system," Applied Physics Letters 106, pp. 062407-1-5 (Feb. 2015).

(Continued)

*Primary Examiner* — Yaritza Guadalupe-McCall
(74) *Attorney, Agent, or Firm* — Vazken Alexanian; Michael J. Chang, LLC

(57) ABSTRACT

Inclinometers with a parallel dipole line (PDL) trap system are provided. In one aspect, an inclinometer includes: a PDL trap having a pair of dipole line magnets, a transparent tube in between the dipole line magnets, and a diamagnetic object within the transparent tube, wherein the diamagnetic object is levitating in between the dipole line magnets; and a sensing system for determining a position z of the diamagnetic object in the PDL trap and for determining an inclination angle θ using the position z of the diamagnetic object in the PDL trap. Techniques to detect the diamagnetic object position using optical, capacitive and manual methods are described. A method for determining an inclination angle θ using the present inclinometers is also provided.

20 Claims, 8 Drawing Sheets

(56) References Cited

U.S. PATENT DOCUMENTS

| | | | |
|---|---|---|---|
| 9,093,377 B2 | 7/2015 | Cao et al. | |
| 9,236,293 B2 | 1/2016 | Cao et al. | |
| 9,263,669 B2 | 2/2016 | Cao et al. | |
| 9,833,415 B2 | 12/2017 | Li et al. | |
| 10,082,408 B2 | 9/2018 | Gunawan | |
| 10,128,013 B1 * | 11/2018 | Gunawan | G21K 1/006 |
| 10,234,286 B2 * | 3/2019 | Gunawan | G01C 9/06 |
| 2017/0045433 A1 | 2/2017 | Gunawan et al. | |
| 2017/0299410 A1 | 10/2017 | Gunawan | |
| 2017/0301445 A1 | 10/2017 | Gunawan | |
| 2018/0003495 A1 | 1/2018 | Gunawan | |
| 2018/0031716 A1 | 2/2018 | Gunawan et al. | |
| 2018/0299581 A1 | 10/2018 | Gunawan et al. | |
| 2019/0107452 A1 * | 4/2019 | Gunawan | G01L 5/0052 |
| 2019/0115132 A1 * | 4/2019 | Gunawan | B81B 7/008 |
| 2019/0162533 A1 * | 5/2019 | Gunawan | G01C 9/06 |

OTHER PUBLICATIONS

Happel et al., "Low Reynolds number hydrodynamics. vol. 1," Noordhoff International Publishing, Leyden, p. 156, 1973.

Ui et al., "Stokes drag on a cylinder in axial motion," Phys. Fluids 27, pp. 787-795 (Mar. 1984).

Gunawan et al., "A Diamagnetic Trap with 1D Camelback Potential," arXiv preprint, arXiv:1405.5220, May 2014 (5 pages).

List of IBM Patents or Applications Treated as Related (2 pages).

\* cited by examiner

PRECISION INCLINOMETER WITH PARALLEL DIPOLE LINE TRAP SYSTEM

CROSS-REFERENCE TO RELATED APPLICATIONS

This application is a divisional of U.S. application Ser. No. 15/198,183 filed on Jun. 30, 2016, the contents of which are incorporated by reference herein.

FIELD OF THE INVENTION

The present invention relates to magnetic parallel dipole line (PDL) trap systems, and more particularly, to a precise inclinometer with a PDL trap system.

BACKGROUND OF THE INVENTION

An inclinometer is an instrument used to measure the relative angle between a plane and the horizontal or vertical direction as defined by gravity. The instrument is also known as a tilt meter, tilt indicator, gradiometer, or level gauge. An inclinometer is needed in various applications such as in civil engineering projects, surveying, well or mine drilling, electronic games, and volcanic eruption monitoring systems.

Available inclinometer systems use liquid level sensing, bubble tiltmeter, capacitive liquid sensing or micro-electromechanical system (MEMS) device. However, each of these systems involves objects that are in contact with one another. Take, for instance, the common level where a bubble within a liquid is used to measure the angle of inclination. The liquid comes in contact with the housing in which it is contained. Thus, there is some liquid-solid (surface) interaction involved, which can adversely affect the detection of very small change of inclination with this instrument.

Therefore, improved inclinometer designs would be desirable.

SUMMARY OF THE INVENTION

The present invention provides inclinometers with a parallel dipole line (PDL) trap system. In one aspect of the invention, an inclinometer is provided. The inclinometer includes: a PDL trap having a pair of dipole line magnets, a transparent tube in between the dipole line magnets, and a diamagnetic object within the transparent tube, wherein the diamagnetic object is levitating in between the dipole line magnets; and a sensing system for determining a position z of the diamagnetic object in the PDL trap and for determining an inclination angle θ using the position z of the diamagnetic object in the PDL trap.

In another aspect of the invention, a method for determining an inclination angle θ is provided. The method includes the steps of: providing an inclinometer comprising a PDL trap having a pair of dipole line magnets, a transparent tube in between the dipole line magnets, and a diamagnetic object within the transparent tube, wherein the diamagnetic object is levitating in between the dipole line magnets; tilting the inclinometer to displace the diamagnetic object in the PDL trap; determining a position z of the diamagnetic object in the PDL trap; and determining the inclination angle θ using the position z of the diamagnetic object in the PDL trap.

In yet another aspect of the invention, another inclinometer is provided. The inclinometer includes: multiple PDL traps positioned at different orientations on a ruler frame, wherein each of the PDL traps has a pair of dipole line magnets, a transparent tube in between the dipole line magnets, and a diamagnetic object within the transparent tube, wherein the diamagnetic object is levitating in between the dipole line magnets, and wherein each of the PDL traps has a manual readout system comprising a label affixed to the dipole line magnets, wherein the label contains markings corresponding to various positions (z) of the diamagnetic object in the PDL trap.

A more complete understanding of the present invention, as well as further features and advantages of the present invention, will be obtained by reference to the following detailed description and drawings.

DETAILED DESCRIPTION OF PREFERRED EMBODIMENTS

Provided herein is an inclinometer based on a parallel dipole line (PDL) trap system. A PDL trap enables trapping of a diamagnetic cylindrical object using transversely magnetized magnets (also called diametric or dipole line magnets) that serve as the PDL trap system. The key feature of the trap is the "camelback magnetic potential" that provides stable trapping in the longitudinal axis. See, for example, Gunawan et al., "A parallel dipole line system," Applied Physics Letters 106, pp. 062407-1-5 (February 2015) (hereinafter "Gunawan"); and U.S. Pat. Nos. 8,895,355, 9,093,377, 9,236,293, and 9,263,669 all issued to Cao et al., entitled "Magnetic Trap for Cylindrical Diamagnetic Materials," the contents of each of which are incorporated by reference as if fully set forth herein. The "camelback magnetic potential" exists along the longitudinal (z-axis) due to the magnetic field enhancement near the edge of the dipole line which occurs for a diametric magnet with length exceeding the critical length $L_C$ where $L_C \sim 2.5a$, and wherein a is the radius of the magnet.

The magnets in the PDL trap have an elongated shape such as a cylinder, bar, or stripe, whose magnetization is in the transverse direction (perpendicular to the long axis). These magnets will be referred to herein as "dipole line" or "diametric" magnets. A diamagnetic cylindrical object such as a graphite rod can be trapped at the center. The diamagnetic cylindrical object will levitate in between the diametric magnet pair. Because the trapped object levitates, it is in a non-contact position with the trap and therefore does not suffer from the set-backs of conventional inclinometers (see above) where various components are in contact with one another. Thus, the present inclinometers can be used for high precision inclination angle measurements.

In general, when the PDL trap is inclined the trapped object is displaced within the trap. Further, the position of the trapped object in the trap depends on the inclination angle (θ). Thus, based on the position of the trapped object in the trap, the inclination angle can be deduced. See, for example, FIGS. 1 and 2.

Figure 1:
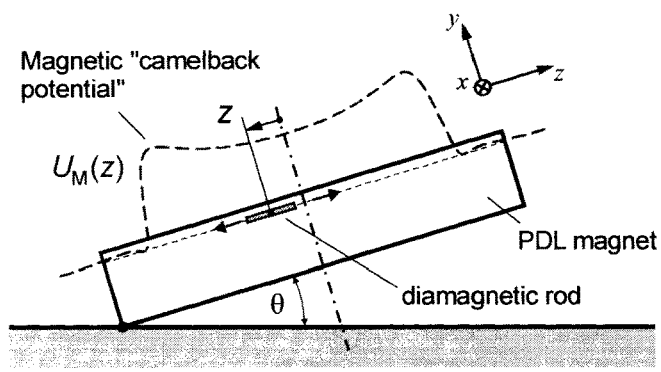
FIG. 1 is a diagram illustrating a PDL trap being tilted to an inclination angle θ according to an embodiment of the present invention.
Figure 2:
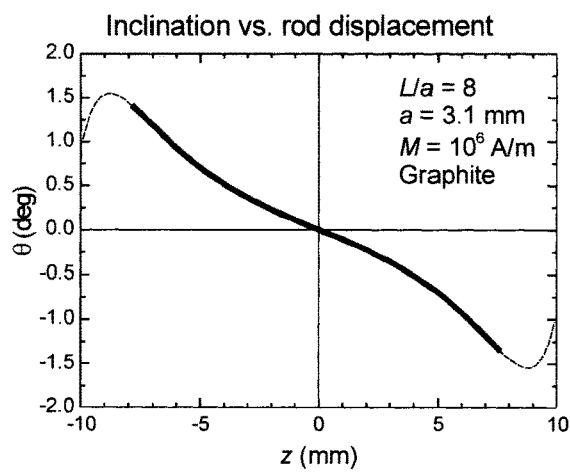
FIG. 2 is a diagram illustrating inclination angle θ as a function of the displacement of the trapped object z according to an embodiment of the present invention.

FIG. 1 is a diagram illustrating a PDL trap being tilted to an inclination angle θ. As shown in FIG. 1, the trapped object (in this case a rod) is confined along the z-axis due to the diamagnetic trapping or levitation effect. At any position in the PDL trap the rod experiences a diamagnetic force: $F_z = -\partial U_M(z)/\partial z$ where $U_M$ is the magnetic potential of the rod in the trap. Using short and small diameter rod approximation, this potential is given as (see Gunawan): $U_M(r) = \chi/\mu_0(\chi+2) \times B_T^2(r) V$ wherein $\chi$ is the magnetic susceptibility, $\mu_0$ is the magnetic permeability in vacuum, $B_T$ is the total magnetic field in the rod and V is the volume of the rod. When the platform is tilted, this force will balance the gravity force projection along the inclined plane: $F_z = mg \sin \theta$ where m is the mass of the rod. Thus the inclination angle can be deduced from the position of the rod, which is related as:

$$\sin\theta = \frac{\chi}{(2+\chi)\mu_0\rho g} \frac{\partial B_T^2(z)}{\partial z}, \qquad (1)$$

wherein ρ is the mass density of the rod and g is the gravitational acceleration. FIG. 2 shows a plot of the inclination angle θ (in degrees) as a function of rod displacement (z).

The total magnetic field that gives rise to the longitudinal camelback potential in the PDL trap, can be calculated from the superposition of the two dipole line magnets (see FIG. 4):

$$B_T(z) = B_M(-d, y_0, z) + B_M(d, y_0, z),$$

wherein ±d is the center position of each dipole line magnet, $y_0$ is the levitation height of the rod and $B_M$ is the magnetic field from each of the dipole line or diametric magnet. For the magnet centered at origin, $B_M$ is given as (see Gunawan):

$$B_M(x, y, z) = \qquad (2)$$
$$\frac{\mu_0 M a}{4\pi} \int_0^{2\pi} \sum_{n=1,2} \frac{(-1)^n}{u_n^2 + s^2 + u_n\sqrt{u_n^2+s^2}} \Big[ x - a\cos\phi, y - a\sin\phi,$$
$$u_n + \sqrt{u_n^2+s^2} \Big] \cos\phi \, d\phi$$

where M is the volume magnetization of the magnet, L is the length of the magnet, a is the radius of the magnet, $s^2 = (x-a\cos\phi)^2 + (y-a\sin\phi)^2$ and $u_n = z \pm L/2$.

Figure 3:
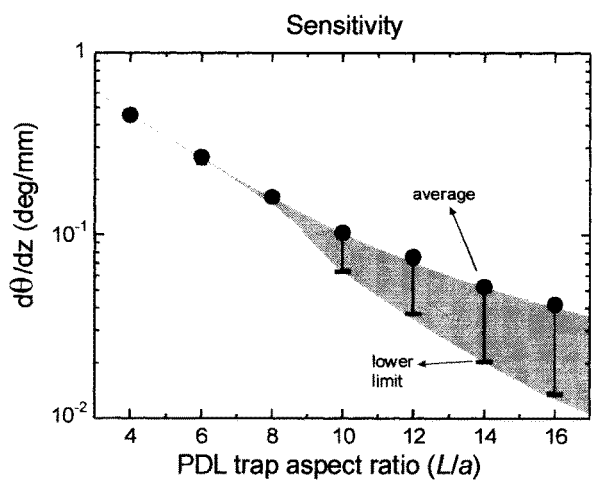
FIG. 3 is a diagram illustrating a dependence of sensitivity of the inclinometer on the aspect ratio (length over radius) of the magnets in the PDL trap according to an embodiment of the present invention.

One consideration in the PDL trap inclinometer design is the damping time constant or the quality factor (Q) of the PDL trap camelback oscillator. Namely, when the trapped rod is displaced, it will oscillate at the center of the trap. See, for example, Gunawan (FIG. 3a—which shows the rod oscillation on the 1D camelback potential extracted from video). The oscillation is damped due to the viscous drag of the rod with the air (or air friction). See, for example, U.S. patent application Ser. No. 14/826,934 by Gunawan et al., entitled "Parallel Dipole Line Trap Viscometer and Pressure Gauge" (hereinafter "U.S. patent application Ser. No. 14/826,934"), the contents of which are incorporated by reference as if fully set forth herein. The quality factor (Q) and the damping time constant (τ) of a harmonic oscillator is related as:

$$Q = \pi \tau f_0, \qquad (3)$$

where $f_0$ is the oscillation frequency of the rod along the camelback trap. In the case where the trapped object has circular cross section like a sphere or a cylinder, the damping time constant is given as:

$$\tau = \frac{m}{3\pi\mu bK'}, \qquad (4)$$

where m is the mass of the rod, $\mu$ is the viscosity of the air and K' is the Stokes drag coefficient which is defined as the ratio of the drag of the object with a sphere of the same circular cross section with radius b, i.e., K'=$F_D$/$6\pi\mu b v$, where $F_D$ is the drag force and v is the object velocity. For a spherical object K'=1. K' depends on the geometry of the object, i.e., the radius and the length and also the size of an boundary, e.g., radius of an enclosing tube.

For the case of a cylindrical rod as the trapped object, unfortunately there is no simple analytical expression of K'. Nevertheless to illustrate the essential physics of how the drag depends on the object geometry (rod radius b and length l) the cylinder can be approximated as a prolate ellipsoid. For a long ellipsoid (l>>b), K' can be derived as:

$$K' = \frac{l}{3b\ln(0.607l/b)} \quad (5)$$

See, for example, Happel et al., "Low Reynolds number hydrodynamics. Vol. 1," Noordhoff International Publishing, Leyden, page 156, 1973, the contents of which are incorporated by reference as if fully set forth herein. This expression reveals that the drag force is stronger for rod which is longer (larger l) or has smaller radius (smaller b).

Figure 4:
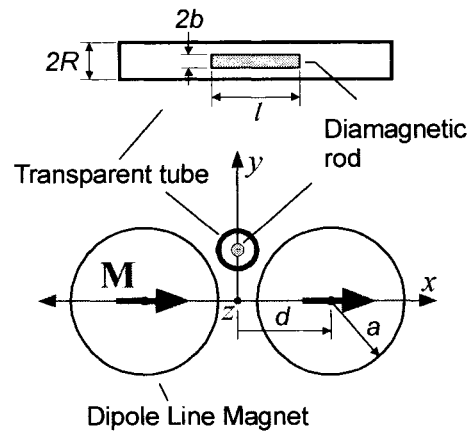
FIG. 4 is a schematic diagram of the PDL trap with the diamagnetic rod and a transparent tube containment to control the damping according to an embodiment of the present invention.

In an inclinometer device, it is desirable for the trapped object to reach the equilibrium point as fast as possible after the device is tilted—otherwise if the oscillation continues the instrument would be hard to read. This can be achieved by setting the oscillator at a critical damping condition, i.e., Q=0.5, by controlling the drag force or the damping time constant in Equation 3 above. To effectively control the damping or the Q factor of the PDL trap oscillator, the diamagnetic object (rod) is placed inside a transparent tube as shown in FIG. 4. The tube serves two purposes: (1) to introduce additional viscous drag to the levitated rod by imposing a closer boundary; and (2) to contain and protect the levitated rod. A transparent tube is chosen so that the diamagnetic rod remains visible. The overall viscous drag depends on the geometry of the system, i.e., the rod radius b, length l and the tube radius R. The length of the tube is not critical but it is normally made to be much longer than the length of the rod (l) or about the same length as the magnet (L).

Figure 5:
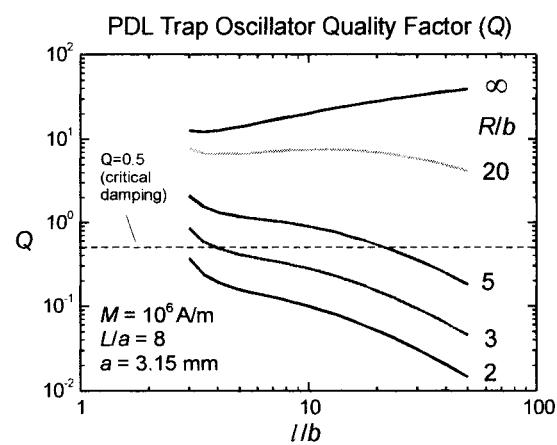
FIG. 5 is the PDL trap oscillation quality factor (Q) as a function of rod length l at various enclosure tube radius R (relative to the rod radius b) according to an embodiment of the present invention.

FIG. 5 shows the dependence of the quality (Q) factor of a PDL trap with respect to the length of the rod (l) and radius of the tube (R). The parameters of the PDL trap are shown in the lower inset of FIG. 5. The calculation is based on empirical formula of a drag force for a cylindrical rod in a cylindrical boundary. See, for example, Ui et al., "Stokes drag on a cylinder in axial motion," Phys. Fluids 27, 787 (March 1984) (hereinafter "Ui"), the contents of which are incorporated by reference as if fully set forth herein (see, e.g., Equation 8 in Ui). For a given rod radius b, the drag becomes larger or Q factor becomes smaller with longer rod length l and smaller containment tube radius R. The desired critical damping condition (Q=0.5) is indicated as the dashed line in FIG. 5.

Figure 6:
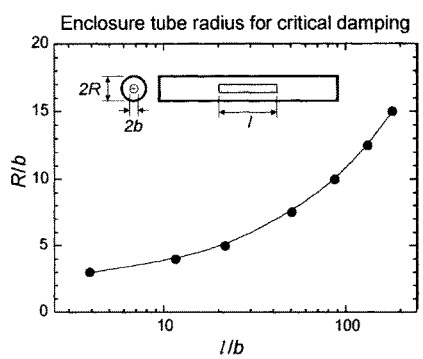
FIG. 6 is the ideal enclosure tube radius R (relative to the rod radius b) as a function of the length of the rod/that yields the critical damping condition Q=0.5 according to an embodiment of the present invention.

FIG. 5 serves as a guideline for optimum design of the inclinometer. To clarify this point, one can choose the length of the rod or the radius of the tube—if any one of this is given—that will yield a critical damping condition (Q=0.5). This relationship is shown in FIG. 6. In general the longer the rod, the larger is the tube radius required.

Another consideration in the PDL trap inclinometer design is the sensitivity. The sensitivity of the inclination angle detection (i.e., how small an angle of inclination that the instrument can detect/measure) depends on the "camelback" potential shape determined by the aspect ratio (i.e., length divided by radius) of the PDL magnets. See, for example, FIG. 2 of Gunawan. Namely, the sensitivity becomes better (smaller resolution) with longer magnets or wider camelback potential at higher aspect ratio (length/radius). Thus, the sensitivity of the present PDL trap inclinometer can be increased by increasing the length over radius ratio (L/a) of the magnet. See, for example, FIG. 3. The minimum and the average sensitivity are also given in FIG. 3. In the present setup, the displacement of the rod can be detected down to ~1 resolution. For a PDL trap with L/a=16 this corresponds to detection resolution of ~0.35 $\mu$rad in inclination angle. This is approximately equal to or better than the resolution of the state-of-the-art commercial inclinometer using other technology.

Once the PDL trap is tilted, displacing the trapped object, the next task is to detect or sense the position of the rod in the trap. Some exemplary, non-limiting sensing scheme examples are now described. In a first exemplary embodiment shown in FIG. 7 (cross-sectional view) and FIG. 8 (side view), an optical sensing scheme is employed. With an optical sensing scheme, a digital video camera is positioned facing the top of the PDL trap and the trapped rod. A suitable optical sensing set-up using a digital video camera is described, for example, in U.S. patent application Ser. No. 14/826,934. The digital video camera captures video images of the position of the rod in the trap. In the example shown in FIGS. 7 and 8, the digital video camera will relay the images of the PDL trap/rod to a microcomputer, where the image data is analyzed to detect the rod position (z) and from that to calculate the inclination angle $\theta$ as provided in Equation 1, above. The results of the analysis can be presented on a display or similar readout, such as a standard LCD display.

As detailed in U.S. patent application Ser. No. 14/826,934, the pixels in a digital camera collect photons which are converted into an electrical charge that represents intensity. During the image analysis, the intensity of the image pixels can be measured from each video frame. By way of example only, the position of the rod in the trap can be determined by choosing a certain intensity value that marks the edge of the rod called "edge threshold."

Figures 7, 8:
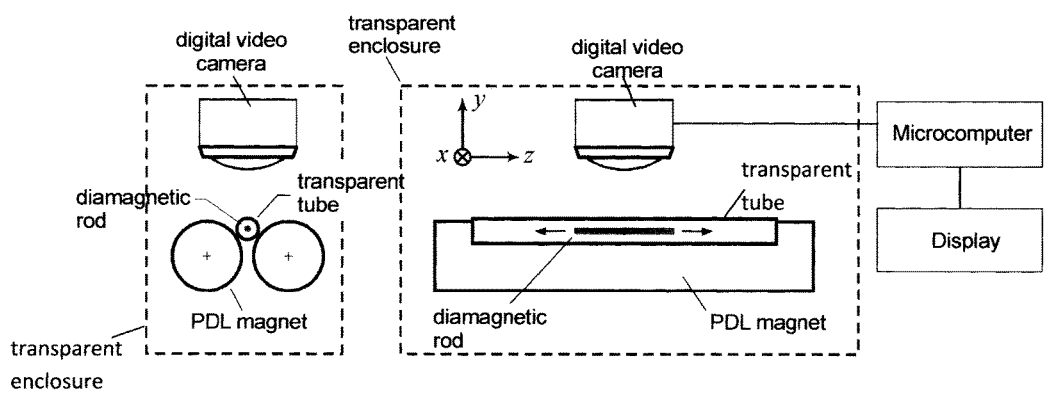
FIG. 7 is a cross-sectional diagram of an optical sensing system for detecting the position of the object in the PDL trap according to an embodiment of the present invention.
FIG. 8 is a side-view diagram of the optical sensing system according to an embodiment of the present invention.

As shown in FIGS. 7 and 8, the inclinometer system can be encased in a transparent enclosure, such as a glass, clear plastic, etc. enclosure. The enclosure will serve to protect the system from the elements, thus permitting the system to be effectively and readily usable in the field.

Figure 9A:
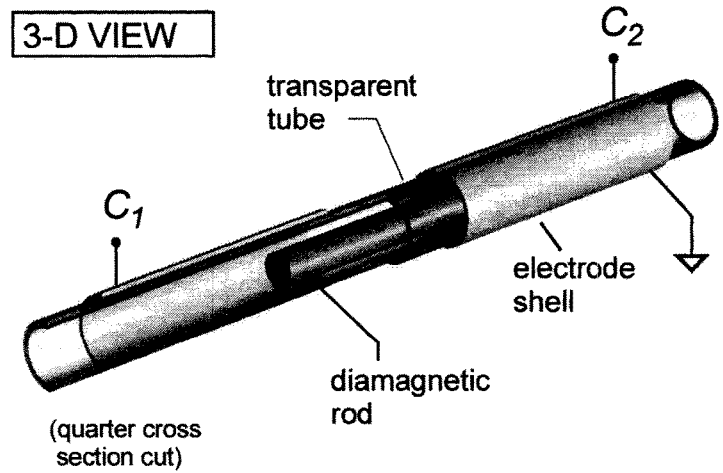
FIG. 9A is a 3-D view of a capacitive sensing system for detecting the position of the diamagnetic object in the PDL trap according to an embodiment of the present invention.
Figures 9B, 9C:
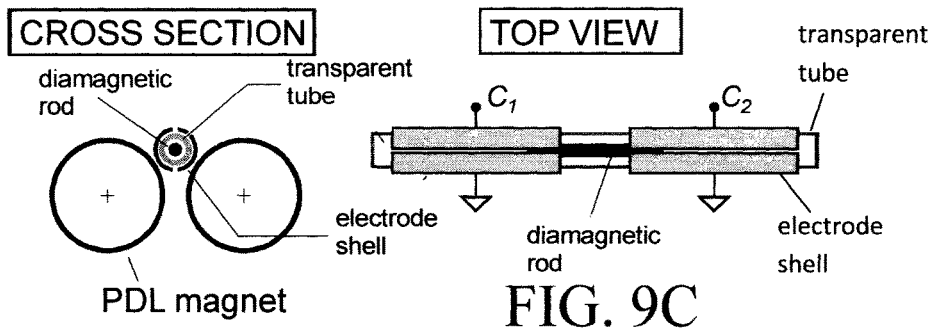
FIG. 9B is a cross-sectional view of the capacitive sensing system according to an embodiment of the present invention.
FIG. 9C is a top view of the capacitive sensing system according to an embodiment of the present invention.
Figure 10:
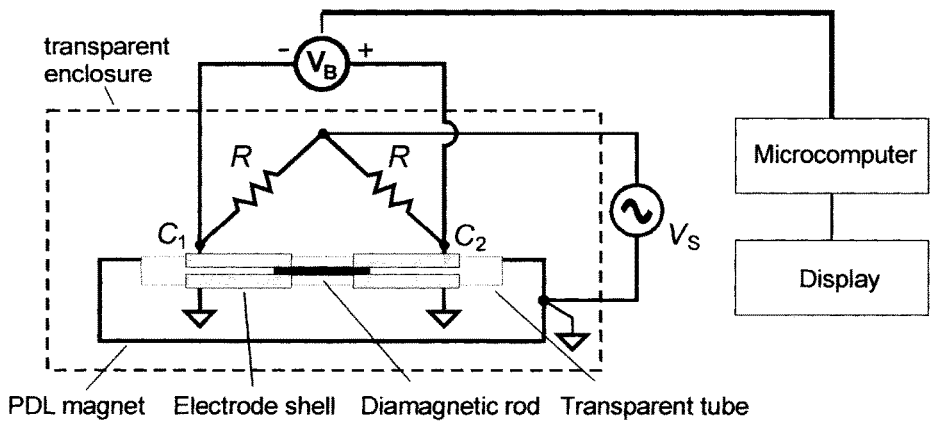
FIG. 10 is an electronics schematic diagram of the capacitive sensing system according to an embodiment of the present invention.

Another exemplary system for detecting a positioning of the rod in the PDL trap includes capacitive sensing using metal electrodes deposited or attached to the outer surface of the transparent tubes as shown in FIGS. 9A-C (i.e., 3-D, cross-sectional and top views, respectively) and FIG. 10 (side view circuit schematics). In general, the capacitive sensing involves placing at least one electrode on the surface of the containment tube which, in conjunction with a capacitance measurement system, can be used to determine the rod's position in the PDL trap based on a change in the capacitance as the rod passes between the electrode and the magnets. See, for example, U.S. patent application Ser. No. 15/131,443, entitled "Voltage-Tunable 1D Electro-Magnet Potential and Probe System with Parallel Dipole Line Trap," the contents of which are incorporated by reference as if fully set forth herein. By way of example only, FIGS. 9A-C and 10 depict a system wherein electrodes are placed over at least the two opposite ends of the containment tube, such that the trapped rod can freely pass in the containment tube between the PDL trap magnets without touching either the electrodes, tube or the magnets. As the rod moves in the trap it changes the capacitance of the system, i.e., the capacitance of the system changes (e.g., increases) when the rod (a conductor) enters between the electrodes and the magnets. Accordingly, the position of the rod (z) can be determined from voltage read out from the system. The inclination angle $\theta$ can then be calculated as provided in Equation 1, above.

Further, by placing multiple (i.e., more than two) electrodes over the trap, the full range of travel of the rod (namely its position anywhere in the trap) can be detected. For this purpose, an RC bridge system can be employed as shown in FIG. 10. An AC voltage excitation is provided ($V_S$), and the differential bridge voltage $V_B$ is monitored. Afterwards, the displacement can be calculated as a function of $V_B$ in the same manner as described in U.S. patent application Ser. No. 15/131,443.

As shown in the exemplary embodiment depicted in FIGS. 9A-C and 10, the capacitance data can be relayed to a microcomputer, where the data is analyzed. The results of the analysis can be revealed on a display or similar readout, such as a standard computer monitor.

As shown in FIGS. 9A-C and 10, the inclinometer system can be encased in a transparent enclosure, such as a glass, clear plastic, etc. enclosure. The enclosure will serve to protect the system from weather and the elements, thus permitting the system to be effectively and readily usable in the field.

Figure 11:
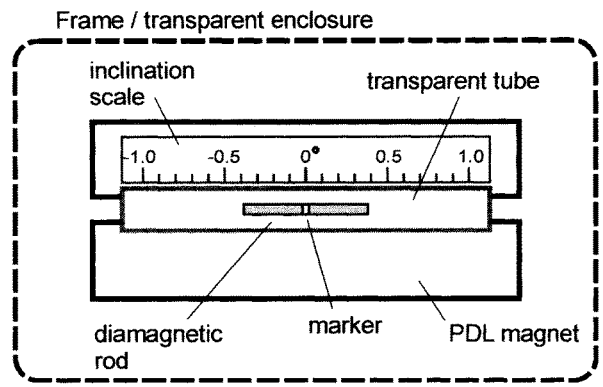
FIG. 11 is a top-view diagram of a manual readout system for detecting the position of the object in the PDL trap according to an embodiment of the present invention.
Figure 12:
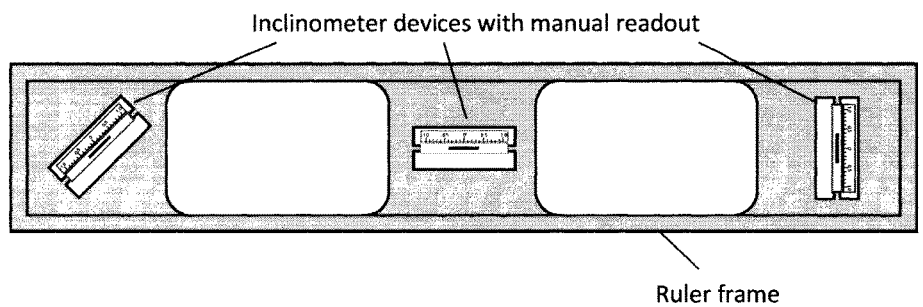
FIG. 12 is a top-view diagram of multiple inclinometer devices with manual readout on a ruler frame according to an embodiment of the present invention.

According to yet another exemplary embodiment, the sensing can be done via a manual readout. See, for example, FIG. 11 (top view) and FIG. 12 (overall view). As shown in FIGS. 11 and 12, a grating label is affixed on (or near) the magnets, wherein the label has markings corresponding to the displacement of the rod or corresponding directly to the angle of inclination. The diamagnetic rod has a marker at the center to indicate the inclination position. For instance, the inclination angle $\theta$ can be pre-calculated for a given PDL trap design (i.e., with given rod and magnet dimensions—see above) for various positions (z) of the rod in the trap and pre-printed on the label. For example, as shown in FIG. 11, the label contains markings from −1 to 1° degree. That way, the users simply have to look at the marking corresponding to the current inclination angle $\theta$ off of the label.

Also, as described in U.S. patent application Ser. No. 15/131,566, entitled "Parallel Dipole Line Trap With Variable Gap and Tunable Trap Potential," the contents of which are incorporated by reference as if fully set forth herein, while the magnets in a PDL trap naturally join together it is possible to use a fixed spacer or fixed/variable fixture to open a small gap between the magnets while still maintaining the trapped object levitated above the trap. Here, being able to open a gap between the magnets can help to enhance visibility of the rod with respect to the grating label as shown in FIG. 11 and also allow the placement of the transparent containment tube.

The use of a manual readout system is a simple and low cost alternative to the optical/capacitance sensing versions above as it does not involve expensive components such as digital video camera and/or microcomputer. However, it is notable that while these various sensing embodiments are described separately above, embodiments are anticipated herein where multiple sensing systems are used in the same device. By way of example only, the grading label can be used in conjunction with either of the optical or the capacitance sensing systems. This would provide a way to double check the measurements and/or calibrate the system.

As shown in FIG. 11, the inclinometer system can be encased in a transparent enclosure, such as a glass, clear plastic, etc. enclosure. The enclosure will serve to protect the system from the elements, thus permitting the system to be effectively and readily usable in the field. The inclination can also be measured simultaneously at various orientations by placing more than one units on a ruler frame as shown in FIG. 12.

Figure 13A:
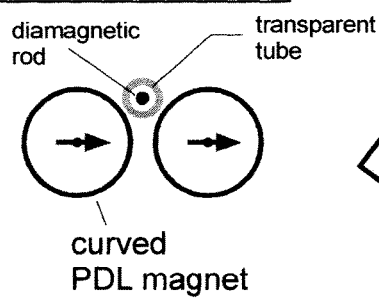
FIG. 13A is a cross sectional diagram of an inclinometer device using curved dipole line magnets to increase the dynamic range according to an embodiment of the present invention.
Figure 13B:
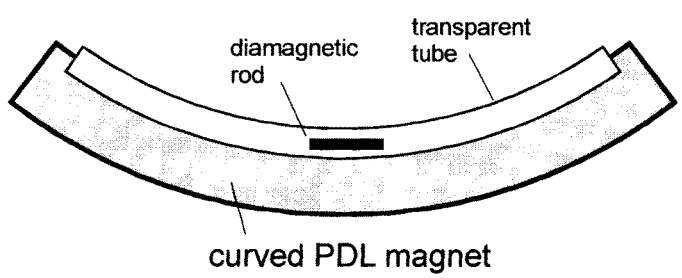
FIG. 13B is a side-view diagram of the inclinometer device using curved dipole line magnets according to an embodiment of the present invention.

While greatly enhancing the sensitivity and granularity of the inclination angle $\theta$ measurements, the devices described above have a somewhat limited dynamic range, e.g., ±1.5° for PDL magnet with aspect ratio length over radius L/a=8. To expand the capabilities of the present device to measure larger inclinations, an embodiment is presented here where the dipole line magnet is shaped into an arc section as shown in FIG. 13, i.e., the magnets are curved. The magnetization of the magnet is kept at the transverse direction (perpendicular to the cylindrical axis). In this way the rod can cover a larger range of inclination albeit at the expense of reduced sensitivity. The rod displacement can be detected by similar optical method, capacitance method or manual method as described previously.

Figure 14:
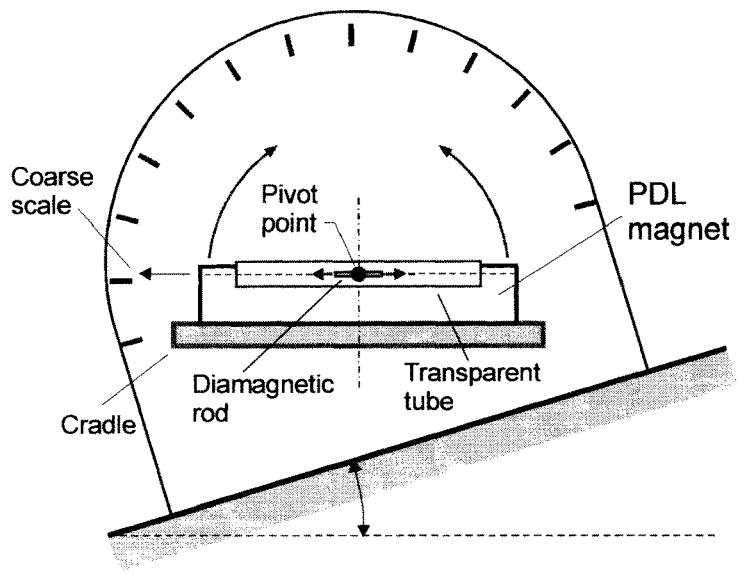
FIG. 14 is a diagram of the present PDL trap system having been integrated with a housing structure that permits both coarse scale and fine scale measurements, thereby expanding the dynamic range of measurements according to an embodiment of the present invention.
Figure 15:
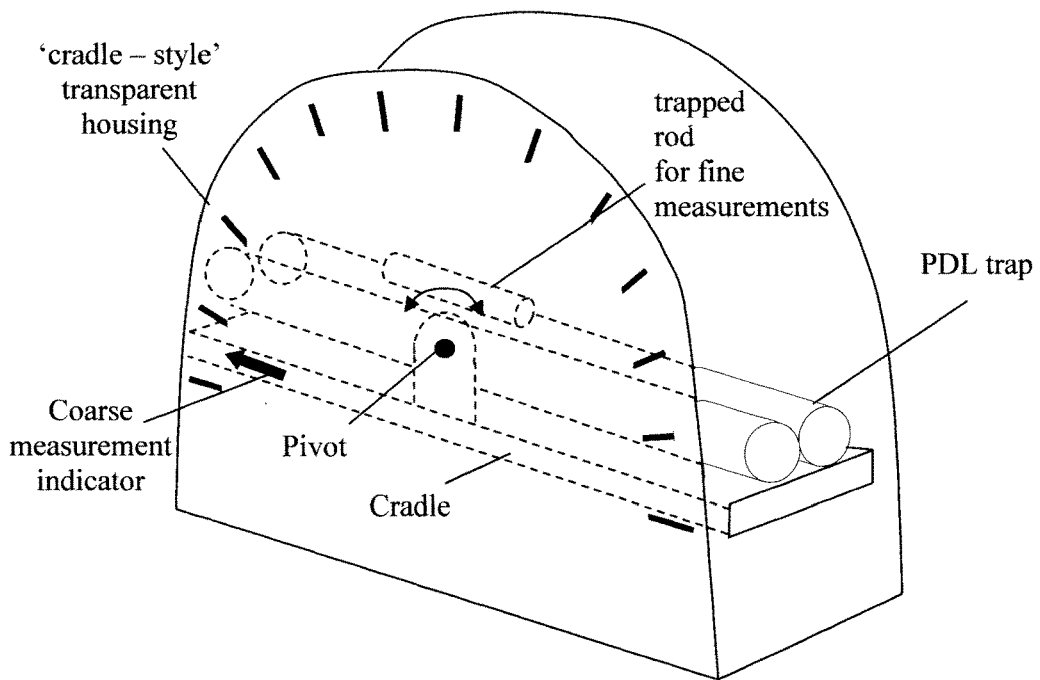
FIG. 15 is a diagram illustrating an exemplary configuration of the housing structure as a cradle in which the PDL trap system can be mounted and pivot freely according to an embodiment of the present invention.

Another embodiment to expand the dynamic range of the inclinometer is presented herein where the present PDL trap system is integrated into a housing structure where the PDL trap is allowed to tilt. See FIG. 14. As shown in FIG. 14, coarse scale measurements can be made via the housing structure, and fine scale measurements are made via the PDL trap (in the manner described above). To use a simple, non-limiting example to illustrate this concept, say for instance that the housing structure is a simple cradle structure as shown, e.g., in FIG. 15, in which the PDL trap system is mounted and is able to pivot. To measure the large inclination angle, first the PDL trap is tilted to the nearest coarse scale in precise 2 degree steps. Afterwards the displacement of the rod in the PDL trap will yield the additional fine inclination angle on top of the coarse readout.

Figure 16:
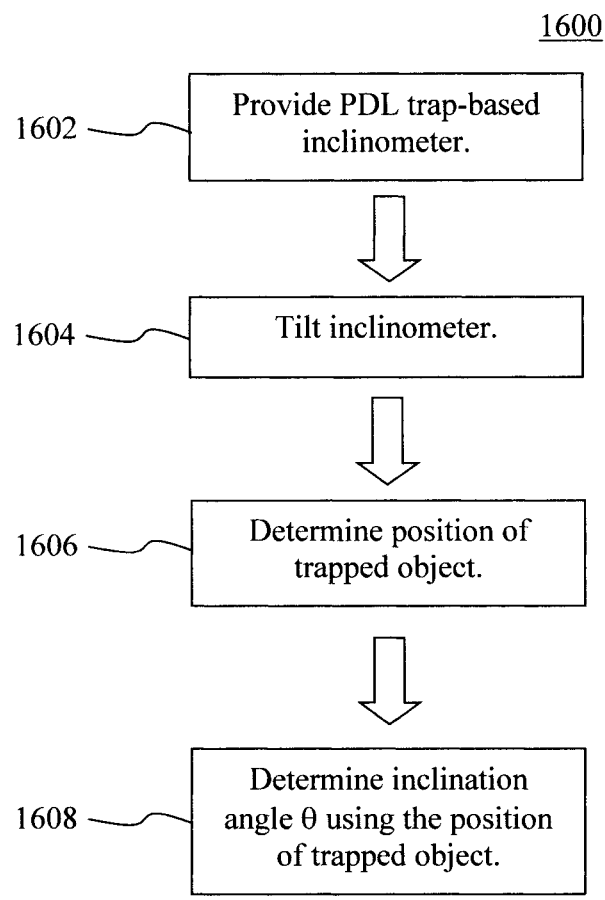
FIG. 16 is a diagram illustrating an exemplary methodology for measuring the inclination angle θ using the present PDL trap-based inclinometers according to an embodiment of the present invention.

FIG. 16 provides an exemplary methodology 1600 for measuring the inclination angle $\theta$ using the above-described inclinometer system designs. In step 1602, the inclinometer is provided having a trapped object (e.g., diamagnetic rod) of certain chosen dimensions and magnets of certain chosen dimensions. Namely, as provided above, the dimensions of the trapped object (e.g., dimension of the trapped rod) can be chosen such that, when the trap is tilted, the object moves to the equilibrium point immediately without oscillating. The sensitivity of the measurements can be adjusted based on the aspect ratio (i.e., length to radius) of the PDL magnets chosen for a given application.

In step 1604, the PDL trap is tilted which displaces the object in the trap. By way of example only, when being used as a 'level' the PDL trap is placed on a surface, and the displacement of the rod in the trap will register the angle of inclination of the surface (relative to the horizontal or vertical direction as defined by gravity).

In step 1606, the position of the object in the trap is determined. Several different techniques for sensing the position of the trapped object were described in detail above, such as optical or capacitance sensing, and/or manual readout via a grating label. As described above, the PDL trap may be integrated into a housing structure where the PDL trap is allowed to tilt. A (first) course scale measurement can be made based on a position of the trap relative to the housing, and a (second) fine scale measurement can be made based on the position of the trapped object in the PDL trap.

Finally, in step 1608 the position of the trapped object is used to determine the inclination angle θ. The inclination angle θ can be calculated based on the positioning of the trapped object using Equation 1, above or using a separate calibration measurement. As provided above, embodiments are presented herein, where the inclination angle θ is pre-calculated for different positions of the object in the trap. These θ values can be placed (via a grating label) on the magnets directly, thus permitting readings to be made manually based simply on visual inspection of the position of the object in the trap.

Figure 17:
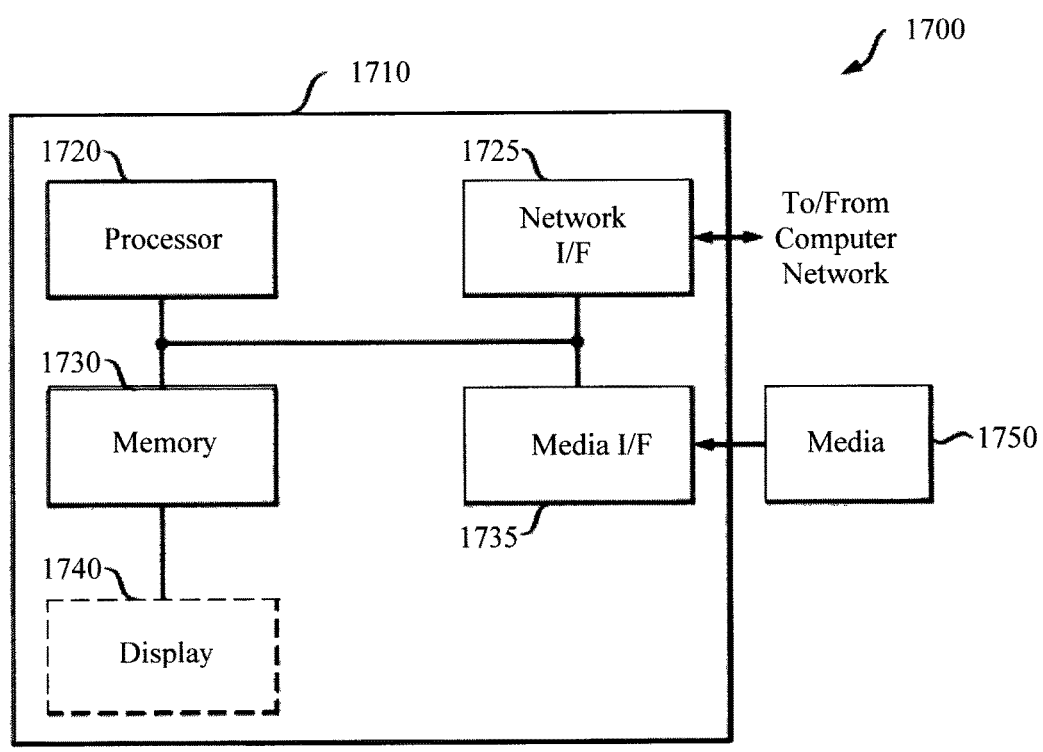
FIG. 17 is a diagram illustrating an exemplary apparatus for performing one or more of the methodologies presented herein according to an embodiment of the present invention.

Turning now to FIG. 17, a block diagram is shown of an apparatus 1700 for implementing one or more of the methodologies presented herein. By way of example only, apparatus 1700 can be configured to implement one or more of the steps of methodology 1600 of FIG. 16. For instance, according to an exemplary embodiment, the microcomputer in the above described sensing systems may be embodied in apparatus 1700.

Apparatus 1700 includes a computer system 1710 and removable media 1750. Computer system 1710 includes a processor device 1720, a network interface 1725, a memory 1730, a media interface 1735 and an optional display 1740. Network interface 1725 allows computer system 1710 to connect to a network, while media interface 1735 allows computer system 1710 to interact with media, such as a hard drive or removable media 1750.

Processor device 1720 can be configured to implement the methods, steps, and functions disclosed herein. The memory 1730 could be distributed or local and the processor device 1720 could be distributed or singular. The memory 1730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1720. With this definition, information on a network, accessible through network interface 1725, is still within memory 1730 because the processor device 1720 can retrieve the information from the network. It should be noted that each distributed processor that makes up processor device 1720 generally contains its own addressable memory space. It should also be noted that some or all of computer system 1710 can be incorporated into an application-specific or general-use integrated circuit.

Optional display 1740 is any type of display suitable for interacting with a human user of apparatus 1700. Generally, display 1740 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. An inclinometer, comprising:
a parallel dipole line (PDL) trap having a pair of dipole line magnets, a transparent tube in between the dipole line magnets, and a diamagnetic object within the transparent tube, wherein the diamagnetic object is levitating in between the dipole line magnets; and
a sensing system for determining a position z of the diamagnetic object in the PDL trap and for determining an inclination angle θ using the position z of the diamagnetic object in the PDL trap, wherein the sensing system comprises at least one of an optical sensing system and a manual readout system.

2. The inclinometer of claim 1, wherein the sensing system comprises the optical sensing system, and wherein the inclinometer further comprises a digital video camera positioned facing the PDL trap and the diamagnetic object for capturing video images of the position z of the diamagnetic object in the PDL trap.

3. The inclinometer of claim 2, wherein the inclinometer further comprises a microcomputer for i) analyzing the video images and ii) determining the inclination angle θ.

4. The inclinometer of claim 1, wherein the sensing system comprises the manual readout system, and wherein the inclinometer further comprises a label affixed to the dipole line magnets, wherein the label contains markings corresponding to various positions (z) of the diamagnetic object in the PDL trap.

5. The inclinometer of claim 1, wherein the dipole line magnets are separated from one another by a gap.

6. The inclinometer of claim 1, wherein the PDL trap is encased in a transparent enclosure.

7. The inclinometer of claim 1, wherein the PDL trap is integrated into a housing structure wherein the PDL trap can tilt within the housing structure.

8. A method for determining an inclination angle θ, the method comprising the steps of:
providing an inclinometer comprising a PDL trap having a pair of dipole line magnets, a transparent tube in between the dipole line magnets, a diamagnetic object within the transparent tube, wherein the diamagnetic object is levitating in between the dipole line magnets, and a sensing system comprising at least one of an optical sensing system and a manual readout system;
tilting the inclinometer to displace the diamagnetic object in the PDL trap;
determining a position z of the diamagnetic object in the PDL trap; and
determining the inclination angle θ using the position z of the diamagnetic object in the PDL trap.

9. The method of claim 8, wherein the sensing system comprises the optical sensing system, and wherein the inclinometer further comprises a digital video camera positioned facing the PDL trap and the diamagnetic object, the method further comprising the steps of:
capturing video images of the position z of the diamagnetic object in the PDL trap; and
analyzing the video images to determine the position z of the diamagnetic object in the PDL trap.

10. The method of claim 8, wherein the sensing system comprises the manual readout system, and wherein the inclinometer further comprises a label affixed to the dipole line magnets, wherein the label contains markings corresponding to various positions (z) of the diamagnetic object in the PDL trap, the method further comprising the step of:
reading the markings to determine the position z of the diamagnetic object in the PDL trap.

11. The method of claim 8, wherein the sensing system comprises the manual readout system, and wherein the inclinometer further comprises a label affixed to the dipole line magnets, wherein the label contains markings corresponding to pre-calculated inclination angles θ for various positions (z) of the diamagnetic object in the PDL trap, the method further comprising the step of:
reading the markings, based on the position (z) of the diamagnetic object in the PDL trap, to determine the inclination angle θ.

12. The method of claim 8, wherein the PDL trap is integrated into a housing structure, and wherein the PDL trap can tilt within the housing structure, the method further comprising the step of:

determining the inclination angle θ using i) a first measurement of a position of the PDL trap relative to the housing structure, and ii) a second measurement of the position z of the diamagnetic object in the PDL trap.

13. The method of claim 8, wherein the inclination angle θ is determined using the position z of the diamagnetic object in the PDL trap as: $\sin \theta = \chi/(2+\chi)\mu_0 \rho g \times \partial B_T^2(z)/\partial z$, wherein $\chi$ is magnetic susceptibility, $\mu_0$ is magnetic permeability, $B_T$ is magnetic field, $\rho$ is mass density of the diamagnetic object and g is gravitational acceleration.

14. The method of claim 8, wherein the dipole line magnets are separated from one another by a gap.

15. The method of claim 8, wherein the PDL trap is encased in a transparent enclosure.

16. The method of claim 8, wherein the diamagnetic object comprises a diamagnetic rod, the method further comprising the step of:

selecting the rod to have a certain diameter to control oscillations of the rod in the PDL trap.

17. The method of claim 8, further comprising the step of:

choosing a radius of the transparent tube to achieve a desired critical damping condition.

18. The method of claim 8, wherein the dipole line magnets comprise cylindrical diametric magnets, the method further comprising the step of:

selecting the cylindrical diametric magnets to have a certain aspect ratio of length to radius to control a sensitivity of the inclinometer.

19. The method of claim 8, wherein the dipole line magnets are curved.

20. An inclinometer, comprising:

multiple PDL traps positioned at different orientations on a ruler frame, wherein each of the PDL traps has a pair of dipole line magnets, a transparent tube in between the dipole line magnets, and a diamagnetic object within the transparent tube, wherein the diamagnetic object is levitating in between the dipole line magnets, and wherein each of the PDL traps has a manual readout system comprising a label affixed to the dipole line magnets, wherein the label contains markings corresponding to various positions (z) of the diamagnetic object in the PDL trap.

* * * * *